US008726005B2

(12) United States Patent
Stavrou et al.

(10) Patent No.: US 8,726,005 B2
(45) Date of Patent: May 13, 2014

(54) WEBSITE MATCHING BASED ON NETWORK TRAFFIC

(75) Inventors: Angelos Stavrou, Springfield, VA (US); Mohammed A. Alhussein, McLean, VA (US); Brian Sanders, Manassas, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 146 days.

(21) Appl. No.: 12/965,413

(22) Filed: Dec. 10, 2010

(65) Prior Publication Data

US 2011/0314269 A1 Dec. 22, 2011

Related U.S. Application Data (60) Provisional application No. 61/285,420, filed on Dec. 10, 2009.

(51) Int. Cl.
*H04L 29/06* (2006.01)

(52) U.S. Cl.
USPC ............................................ 713/150; 726/32

(58) Field of Classification Search
USPC ................ 713/150; 726/30; 370/390
See application file for complete search history.

(56) References Cited

U.S. PATENT DOCUMENTS

| 7,317,693 | B1 * | 1/2008 | Roesch et al. | 370/252 |
|---|---|---|---|---|
| 7,983,241 | B2 * | 7/2011 | Furuskar et al. | 370/352 |
| 2003/0074388 | A1 * | 4/2003 | Pham et al. | 709/106 |
| 2003/0075167 | A1 | 4/2003 | Dominguez | |
| 2004/0104807 | A1 * | 6/2004 | Ko | 340/5.83 |
| 2005/0286145 | A1 | 12/2005 | Silhengst | |
| 2006/0233152 | A1 * | 10/2006 | Suda | 370/347 |
| 2007/0134316 | A1 | 6/2007 | Li et al. | |
| 2007/0147041 | A1 | 6/2007 | Shiratsuchi | |
| 2008/0092879 | A1 | 4/2008 | Dominguez | |
| 2009/0003282 | A1 * | 1/2009 | Meylan et al. | 370/331 |
| 2009/0077673 | A1 * | 3/2009 | Schmelzer | 726/30 |
| 2009/0316840 | A1 * | 12/2009 | Park et al. | 375/341 |
| 2010/0023499 | A1 * | 1/2010 | Johnson et al. | 707/5 |
| 2010/0030912 | A1 * | 2/2010 | Finkenzeller et al. | 709/233 |
| 2010/0232431 | A1 * | 9/2010 | Sebastian | 370/390 |
| 2012/0033558 | A1 * | 2/2012 | Ford et al. | 370/241 |

FOREIGN PATENT DOCUMENTS

| DE | 202006014814 | 1/2007 |
|---|---|---|
| EP | 1251366 | 10/2002 |
| WO | WO 99/14528 | 3/1999 |
| WO | WO 2009/056000 | 5/2009 |

OTHER PUBLICATIONS

Wang Zhulong; Automatic Special type Website Detection Based on Webpage Type Classification; Year:2004; ACM; pp. 1-12.*
Extentended European Search Report issued in EP 11182373.8 on Jan. 30, 2013.

(Continued)

*Primary Examiner* — Monjour Rahim
(74) *Attorney, Agent, or Firm* — DLA Piper LLP (US)

(57) ABSTRACT

A website fingerprint is generated that characterizes network traffic associated with a website as a website traffic fingerprint that includes size description(s), order description(s), and timing description(s) of packet traffic for the website. A website monitor generates website trace(s) of packet statistics. A correlation processor correlates a sequence of packet statistics from the website trace(s) with the size description, the order description, and timing description found in the website traffic fingerprint(s).

23 Claims, 7 Drawing Sheets

(56) References Cited

OTHER PUBLICATIONS

English Language Abstract of DE 20 2006 014814 published Jan. 4, 2007.

Marc Liberatore, Brian Neil Levine. *Inferring the source of encrypted HTTP connections*, Proceedings of the 13th ACM conference on Computer and communication security, Oct. 30-Nov. 3, 2006, Alexandria, Virginia, USA.

Heyning Cheng, Ron Avnur. *Traffic Analysis of SSL Encrypted Web Browsing*, 1998.

Naguyen T. and Armitage G. *A Survey of Techniques for Internet Traffic Classification Using Machine Learning*, IEEE Communications Survey Tutorials, vol. 10, No. 4, Fourth Quarter, 2008.

Charles Wright, Lucas Ballard, Fabian Monrose, and Gerald Masson. *Language Identification of Encrypted VoIP. Traffic*, 16th USENIX Security Symposium, Nov. 2007, Baltimore, Maryland, USA.

Charles Wright, Lucas Ballard, Scott Coulls, Fabian Monrose, and Gerald Masson, *Spot me if you can: recovering spoken phrases in encrypted VoIP conversations*, IEEE Symposium on Security and Privacy, May 2008.

George Dean Bissia, Marc Liberatore. David Jensen, and Brian Neil Levine. *Privacy Vulnerabilities in Encrypted HTTP Streams*, Computer Science Department Faculty Publication Series, Paper 98, 2005.

V.D. lzadinia, D. G. Kourie, and J. H. P. Eloff, *Uncovering identities: A study into vpn tunnel fingerprinting*, Computers and Security, vol. 25, No. 2, pp. 97-105, 2006.

\* cited by examiner

| Sample Index | 5 | 5 | 10 | 15 | 5 | 20 | 10 | 15 |
|---|---|---|---|---|---|---|---|---|
| | 1 | 2 | 3 | 4 | 5 | 6 | 7 | 8 |

| Fingerprint Index | 5 | 5 | 10 | 15 | 5 | 20 | 10 | 15 |
|---|---|---|---|---|---|---|---|---|
| | 1 | 2 | 3 | 4 | 5 | 6 | 7 | 8 |

Matrix

| 1 | 3 | 1 | 6 | 4 |
|---|---|---|---|---|
| 2 | 7 | 2 |   | 8 |
| 5 |   | 5 |   |   |

WEBSITE MATCHING BASED ON NETWORK TRAFFIC

CROSS-REFERENCE TO RELATED APPLICATIONS

This application claims the benefit of U.S. Provisional Application No. 61/285,420, filed Dec. 10, 2009, entitled "Exposing Encrypted HTTP Traffic over VPN Using Pattern Learning," which is hereby incorporated by reference in its entirety.

DETAILED DESCRIPTION OF EMBODIMENTS

Embodiments of the present invention characterize network traffic associated with a website as a website traffic fingerprint that includes size, order, and timing statistics descriptive of packet traffic for the website. Further embodiments use the characterization to detect network traffic associated with that individual website regardless of: whether the packet data is encrypted or in the clear; and/or whether the packet data is mixed with other packet data.

Embodiments of the present invention determine information about web traffic inside a Virtual Private Network (VPN) tunnel. Specifically, some embodiments of the present invention search for fingerprints in encrypted traffic to enable determining information about web traffic inside a VPN tunnel.

A fingerprint in accordance with embodiments of the present invention includes data that characterize the communication of information to and/or from a website. In some embodiments, the data may include the size of packets, the ordering of packets and the timing of packets.

Embodiments may analyze multiple independent streams, and handle background noise or multiple sessions inside the same tunnel. Embodiments may also identify traffic from specific websites outside of VPN tunnels.

Virtual Private Networks, or VPN's, have become a common extension of many corporate and home networks. They allow disjointed entities to communicate in a very cost efficient manner, by using the Internet. Since this traffic can be very important to the users, the security of VPN's should be analyzed and well understood. In many cases, the algorithms used are very well tested and considered unreasonably difficult for an attacker to penetrate. Embodiments of the present invention analyze web traffic without attacking the encryption directly.

The usage of encryption to protect data provides confidentiality for data being sent through the tunnel. The inability to read data however, does not guarantee that something useful cannot be learned by analyzing a flow of data. For example, encrypting communications between two points does not hide the fact that communication is taking place, nor does it hide the amount of data that was transferred between the two points. Therefore, it may be important to understand what is protected when using a secure communication method. A lack of this type of understanding may be more dangerous than even an unsecured communication, as users may be working off a false assumption of anonymity.

The ability to use the characteristics of the transactions taking place across a VPN has provided multiple different areas of research. Using these techniques to analyze web traffic may reveal the source or destination of a communication. Patterns in the stream may be used to classify the type of traffic inside the tunnel. Similar data leakage may be used to analyze Voice over IP (VoIP) traffic to determine the language or recognize specific phrases. These are all examples of how the characteristics of an encrypted stream may still provide data.

According to embodiments, specifically in the case of analyzing Hypertext Transfer Protocol (HTTP) traffic, one may determine the websites visited under the assumption that only a single user's traffic is in the tunnel. Although some VPN's are intended for single users, it is also very common for VPN's to carry traffic of many users, or for a single user to produce additional traffic on the same link. In some cases, it may be difficult to separate out individual flows of data for traffic contained in the same tunnel. Embodiments of the present invention overcome this limitation.

A method that directly addresses the ability to analyze hypertext transfer protocol secure (https) traffic uses characteristics of the https protocol to assist in analyzing the captured flows. The main element used is the download of html pages, followed by overlapping requests for the remaining objects. The ability to discern this html file provides a means of fingerprinting websites. Further details might be gained by looking at the number and size of additional objects downloaded following the html section of the website. These can be categorized separately due to different source ports making the request for each object discernable even when multiple objects are being downloaded concurrently due to the https protocol encrypting each stream individually.

The ability to fingerprint websites based on the https protocol behavior inherently depends on the ability to separate out a single stream of traffic. As long a single user is making requests that do not overlap with other traffic, the workings of the protocol may be seen. When you apply additional requests or background traffic, this may become less clear. The assumption in these cases may be that html will never overlap with objects, due to the requirement that the html be fully downloaded before the objects are determined. However, if there are multiple browsing sessions included in the same tunnel, they could overlap making the size unrecognizable for either request.

In some cases, a setup may consist of a single user protecting http traffic with a secure shell (SSH) tunnel to a remote location. SSH is a network protocol that allows data to be exchanged using a secure channel between two networked devices. According to embodiments, a third party may analyze sites by viewing the traffic between two encrypted endpoints. Profiles may be created for websites. Different statistical methods may be used for comparing the SSL traffic to the database of known and gathered characteristics.

Embodiments of the invention provide new mechanisms for analyzing a capture file. Assumptions that each individual request can be separated using timing may not be valid. Some embodiments overcome the assumption that html may need to be separated from objects. According to embodiments, determining these divisions may not be necessary to determine when a new website is visited. Some methods of comparison assume that only a single website exists in the captured comparison trace, and therefore may be compared to database of websites. Alternative embodiments handle multiple requests, background noise and multiple overlapping flows in the same tunnel.

According to embodiments, a database of the Internet (and parts thereof) could be created. This database might require volunteers profiling websites, and a modest amount of storage (e.g. 13 GB of storage). The feasibility of such a database is may be useful in multi-flow analysis that uses fingerprints of desired websites based on size and timing.

Embodiments may include: the ability to detect individual page loads based on the timing separation between pages, and the ability to detect TCP handshakes and closings by analyzing the size of the packets. In the case of a single user, all data during a page load may be compared to a fingerprint. According to embodiments, fingerprints may provide an ability to detect pages in the presence of background noise with complex matching.

Stream Analysis for Multiple Users

Useful information may be determined from encrypted traffic. However, embodiments may need to use packet characteristics in a way that is not flow dependent. Basically, embodiments may not assume that all packets from a single request are be grouped together. With this in mind, the following sections will discuss how embodiments may use packet size, timing, direction, and order to create flow independent website fingerprints.

Packet Size

Figure 1:
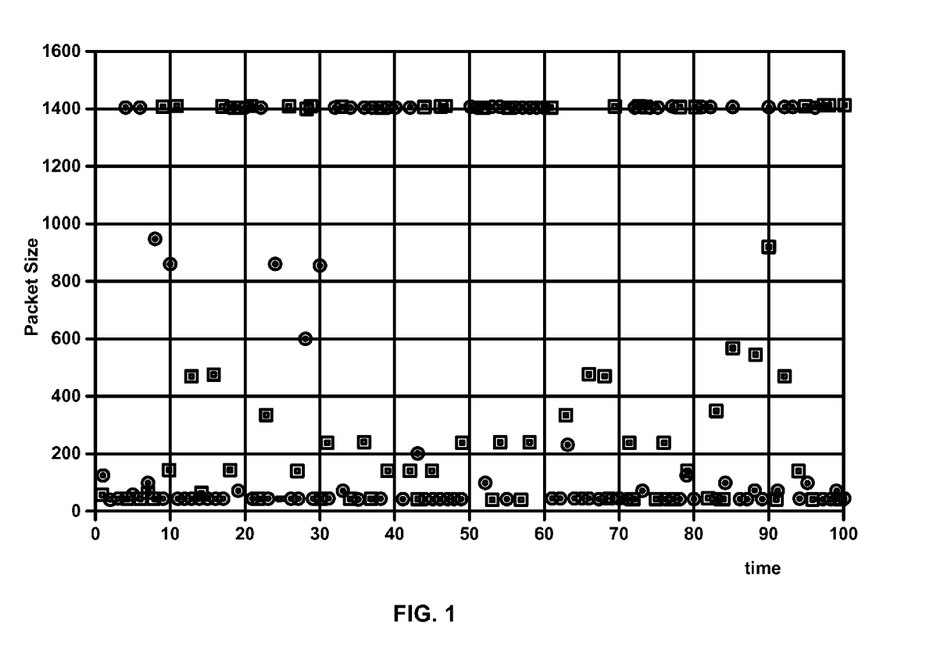
FIG. 1 is a plot showing a small sub-section of 100 packets from two separate web requests to different websites.

To allow for packet size to remain relevant when multiple connections may overlap, the set of data that may overlap in a fingerprint may become more important. Fingerprints of a website may need to contain highly unique sizes, which indicates that not all packets may be relevant for a fingerprint. FIG. 1 is a plot showing a small sub-section of 100 packets from two separate web requests to different websites (netflix and newegg).

One observation is that many packets in these transactions are at one of the extremes of packet size. Transmission Control Protocol (TCP) is one of the core protocols of the Internet Protocol Suite that provides the service of exchanging data directly between two network hosts. TCP connections have a maximum packet size, and both transactions have many packets at this max. Secondly, TCP relies on acknowledgement packets, which comprise the bulk of the minimum packets seen in both transactions. These minimum and maximum packet sizes may provide very little information as to which website is actually being visited, since they may not be added all together. If these packets are included in a fingerprint, they are likely to increase false matches more than provide certainty of the intended website. In the case of the plot in FIG. 1, only 20 packets out of the 100 shown were between the minimum and maximum packet sizes. Therefore up to 80% of this sub-section would match almost any other site if all packets were used.

Using this observation, embodiments may make a size portion of the fingerprints based on an "interesting" packet size range, which excludes maximum sized and minimum sized packets. The two traces in FIG. 1 are much more unique when only this section is viewed. This may provide a much more specific fingerprint and reduces false positives. Also, when every packet is not needed for a fingerprint, the effect of re-transmissions on detection can be reduced. Interesting packets may be defined as any packet above approximately 400 bytes and below approximately 750 to 1000 bytes. Interesting packets are also referred to as fingerprinting packets.

Timing and Order

A second available characteristic which carries through to the encrypted stream is the timing of the packets. Generally the round trip time of a packet is dependent on the location of the person accessing the server. This round trip time may not vary greatly between many sites, and requires the ability to associate a request with a response. Therefore a timing variable may be used which is both more unique per website, and not dependent on the ability to associate a specific request with a response.

Figure 2A:
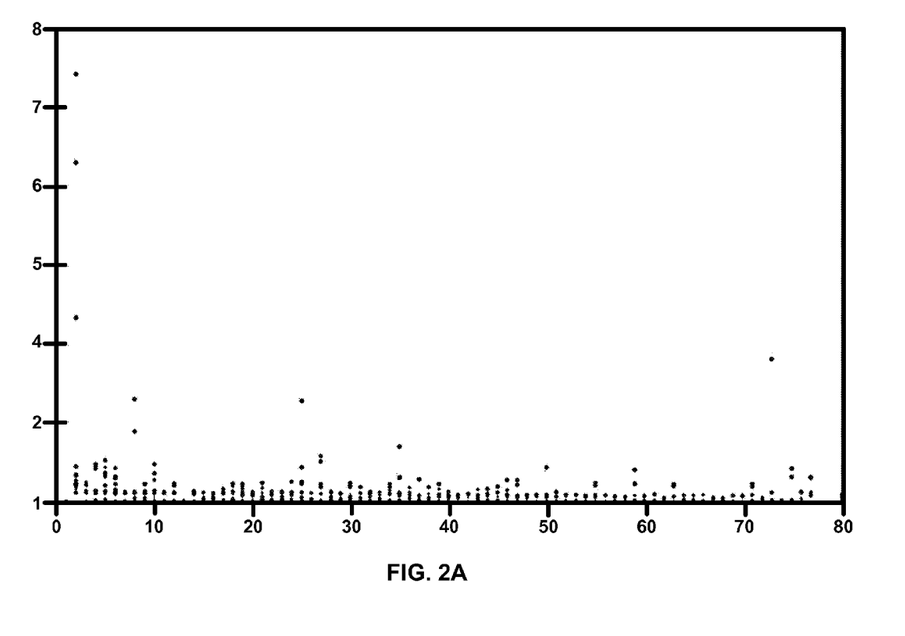
FIG. 2A, FIG. 2B and FIG. 2C are graphs of minimum and maximum arrival times for website packets.
Figure 2B:
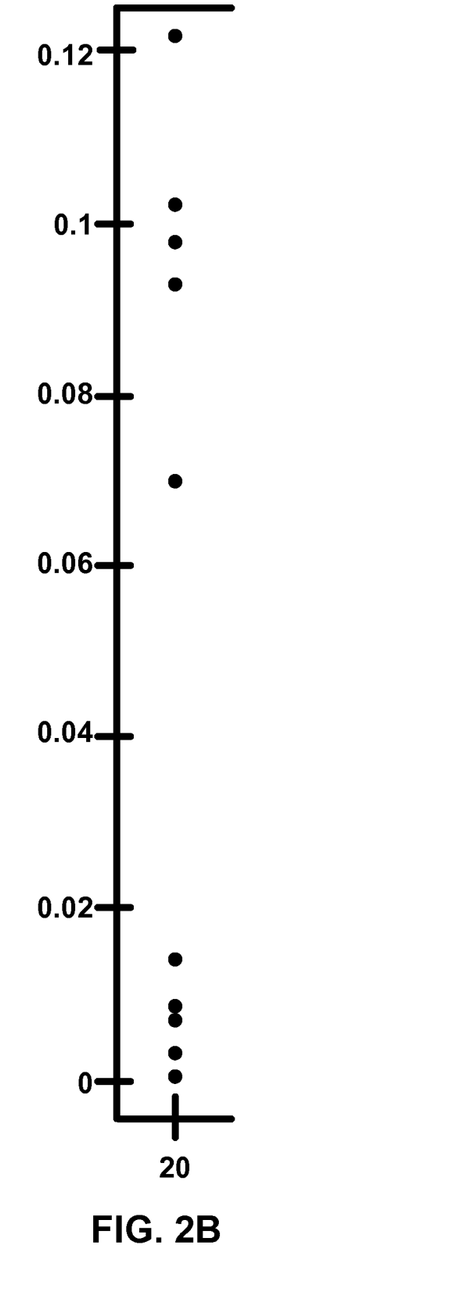
Figure 2C:
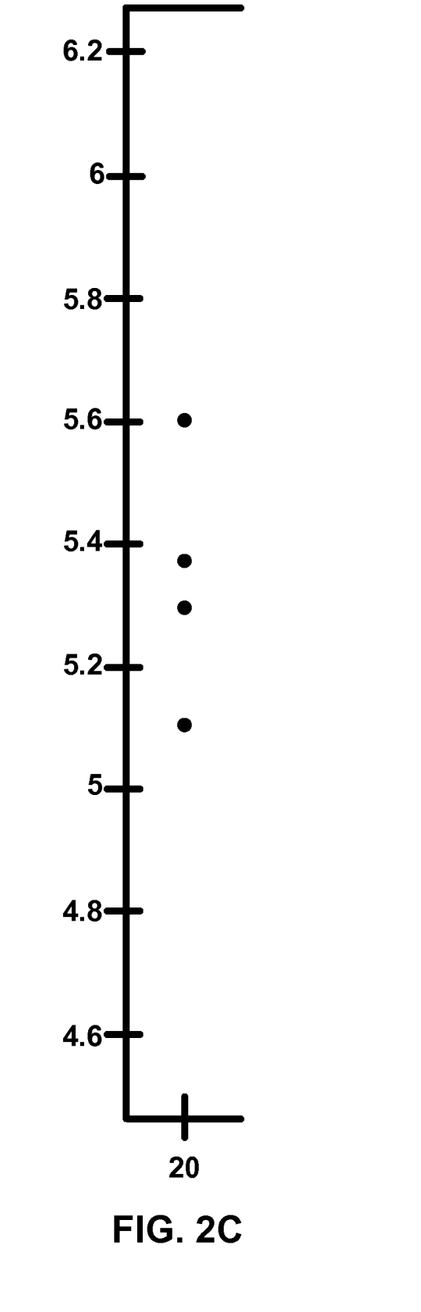

To accommodate these restrictions, timing measurements between arrival times of interesting packets may be used. To correctly analyze timing in this way, a third characteristic of the traffic, the order of interesting packets, may be used. The interesting packet sizes should arrive in the same order for inter-arrival times to be relevant. The reduced number of packets due to limiting analysis to interesting traffic should make this possible. The accuracy of this process may rely on the arrival times between multiple sites to vary more than the round trip times mentioned earlier. To test this, interarrival time minimum and maximum timings for twenty similar websites were graphed. The minimum and maximum arrival times for each packet are graphed per website. FIG. 2A shows the results for all websites, indicating that some websites have a very long range, and often would not match incorrect sites. FIG. 2B shows a section of the 20th packet from all websites tested. Here it becomes clearer that min-max pairs have a distinct range. Finally FIG. 2C shows a very small section of packets at the very bottom of the trace. These packets highlight that a very tight timing range can exist at any give point in the sequence. This tends to indicate that even if there is some over lapped timings for some sections of websites; it appears unlikely that the same website will contain overlapping timings for every interesting packet.

During fingerprint generation, the time between interesting packets may be recorded. These values may be stored for each pair; therefore 19 timing values may be needed with the fingerprint if there are twenty packets in the fingerprint. After multiple runs, the timing between each pair of packets may be analyzed to find a minimum and maximum arrival time for the website. Therefore, website fingerprints may consist of only interesting packets, in a specific order per website, with a set of timings between each packet.

Packet Direction

Another variable available with encrypted traffic is the direction of the traffic. Divide the stream into two directions, inbound and outbound. The inbound traffic would be all traffic arriving from the Internet towards the client, while the outbound traffic is the requests out from the client to the server. These two directions may be viewed as independent streams, since it may be difficult to reliably correlate requests to responses in a multi-user scenario. Comparing the inbound and outbound streams can provide two different observations.

First, the outbound packets may have a more reliable timing. The outbound packets may have very little network equipment to traverse before arriving at the monitoring point. The latency between the client and the VPN entry may therefore be low, when compared to latency times across the Internet. This low latency should create a more stable timing variation between packets. Additionally, requests from the client should not experience as much variance due to higher load due to the simple nature of the request verses a server providing files and database access.

Secondly, the outbound traffic may be more likely to arrive in the expected order as seen in the fingerprint. Again, a smaller amount of network equipment to traverse should decrease the chance of an out of order arrival. Additionally, the requests sent by the client are less likely to be broken up into unexpected sizes, while a server might provide some information differently according to its current load.

Due to these reasons, some embodiments may focus on attempting to detect websites in encrypted traffic based solely on the outbound stream of traffic. This may provide the additional benefit of reducing the number of packets which must be analyzed, as most web transactions have many more inbound packets than outbound.

The focus on outbound traffic could allow for one parameter defined earlier to be relaxed, the interesting packet size range. Inbound traffic has many maximum size packets, while outbound traffic has relatively few. Therefore, embodiments may re-define an interesting packet size to include these packets to obtain more fingerprint information, if only web traffic is present on the link to be analyzed. If, however, there may be other protocols on the link, a range may still be necessary since other protocols may result in large outbound packets. To ensure the method is more robust, embodiments may keep the range as defined earlier.

Multi-User Search Process

A detection mechanism may be utilizing using previously described metrics in a multi-flow environment. A website detector may be viewed as two subcomponents, the fingerprint generation mechanism, and the comparison mechanism. The fingerprint mechanism may be provided with many samples of a web request, and subsequently generate website fingerprints. The comparison mechanism may be provided a trace file to be analyzed and website fingerprints for sites to be identified. The comparison mechanism may then determine if any sequences in the trace match the provided fingerprints and return the results. The following sections will describe how these two mechanism work.

Fingerprint Generation.

To generate a fingerprint, trace files of successful visits to the websites to be fingerprinted should be collected. In some embodiments, it may be advantageous that the only traffic in the trace belongs to the desired website. Fingerprint generation may require a large number of traces to ensure the fingerprint can accurately reflect the site under varying conditions.

As an example, this information may be gathered using two Linux machines, with an OpenVPN connection between them. One end would be the "client" end of the connection, while the other would run a web proxy listening locally on the tunnel interface. The client may make web requests through the tunnel to the proxy server on the other side. Using tcpdump, capture files may be created of both the clear text, and encrypted traffic, at the same time. Having both traces allows for using the encrypted traffic for fingerprint generation, while still maintaining the clear text to analyze any unexpected behavior. This process may be scripted. In an example test, this process was run to gather 100 traces for each website to be analyzed. Once the capture files are available, a fingerprint may be made for each site.

Example traces for a specific site may be made accessible to the fingerprint generation mechanism. Each trace may be divided into the inbound and outbound directions. As described earlier, some embodiments may only focus on the outbound direction traffic. Foe the purposes of describing this particular embodiment, in the remaining steps only the outbound traffic is used. Additionally, embodiments may focus only on the interesting, as defined earlier, from each of these traces.

Trace files which contain packets with the correct direction and size may be analyzed. Traces may be analyzed and a pair of vectors created to describe each trace. The first vector may contain the size of each packet, in the order they are seen in the trace file. The second vector may contain the time at which each packet arrived. The length of the vectors may depend on the number of interesting packets in the corresponding trace file they were generated from. Since the index may represent the order of the packets, these two vectors may quickly allow the determination of arrival time and size of packets according to their order of arrival. The two vectors may need to be keep consistent, therefore any alterations or deletions may need to be completed on both vectors the same way.

Once the vectors are created for test runs of a site, vectors may be grouped together by vector length. These groupings may represent multiple possible sub-fingerprints for a single website. Since timing may be defined as the difference since the last interesting packet, the number of interesting packets may have a large impact. Therefore these sub-fingerprints may allow for some variation in expected responses while keeping the timing data a viable means of comparison.

Each of these groupings may now undergo processing to create website fingerprint(s). The processing may accomplish two goals. First, network errors or anomalies may be removed from test sets. Fingerprint generation may be automated to allow for large number of runs. However, a mechanism may be necessary to ensure that any errors in page loads or network problems do not corrupt fingerprint(s). A first step may be to remove detectable errors to ensure a clean fingerprint(s). After this process, there may still be some variation due to a website itself. For example, there might be some page loads which are requested in slightly different order, which is common for the page. Therefore, it may be useful to reduce the sub-fingerprints of group(s) down to similar portions of a requests while still keeping the fingerprint unique enough to match.

According to embodiments, one reduction reduction may focus on removing vectors that fall into these groups, but are very far apart from any other vectors. These may be detected by finding a "miss rate" for vector(s) in the group. To find this, embodiments may start with the first element of the vector to be tested, and compare its size value to all other vectors in the same group. A miss may be recorded for every mismatch found. This may be done for every element of the vector to be tested, resulting in a miss rate for the entire vector. This miss rate may then be used in formula (1) to generate a miss ratio. The number of misses is represented by m. The number of elements in the current group is represented by g. The length of the vectors in the group is represented by l $$(m/g)/l \tag{1}$$

Vectors containing a very high miss ratio may represent data which is most likely bad, but still happened to be of the correct length to fit into the group. Any vectors that have a miss ratio over a set threshold may be removed from the group, as they may represent errors that could corrupt the fingerprint.

According to embodiments, another reduction may focus on correcting for small variations which may be common due to factors such as dynamic web content, adds on to a page, etc. These might still generate the same number of requests, but it is possible that some get requests could be a slightly different size, causing the vectors to not match every size exactly the same. To generate a single fingerprint representing the entire group, while still allowing for these variations, embodiments may remove the variable packets from the fingerprints. The first index in the first vector may be compared to the first index of every other vector in the group. If the index is not found to match every other vector in the group, then that index may be removed from all vectors in the group. This may be repeated for every index in the vector, removing any that do not match all other vectors in the group. When done, the remaining vectors may all match, in size and sequence. The removed entries may represent the variable data from the website, while the remaining entries may be the data point which should always be present. The remaining vector may provide the size-order portion of the fingerprint for the group.

Additionally, the number of traces in each grouping may be evaluated and any grouping with less than a minimum number of traces dropped. These groups may still be present especially if they contain only a single element. A single element group may not have been removed by the previous methods as they may not have any error rate at all, but still represents data which needs to be removed.

Finally, the timing portion of the fingerprint may be created for the groups. Each vector in a group may have corresponding timing vectors, which have been altered in the same way as the size vectors. To create a timing vector, the first and second entries may be compared to find the time delay between these two interesting packets. This may be done for all vectors in the group, and the minimum and maximum delays seen may be recorded for the timing portion of the fingerprint. This may be done for each interesting packet pair in the sequence, resulting in a minimum and maximum expected inter-arrival time for all packets in the sequence.

According to embodiments, the timing data, along with the size-order data, creates one sub-fingerprint for the designated website. A website may contain multiple sub-fingerprints, one for each grouping found. All sub-fingerprints together may create a fingerprint for the website as a whole. When testing for a match, any of these sub-fingerprints being found may indicate a match for the website.

Comparison Mechanism

The previous sections describe how to generate fingerprints for sites to be tested. Once these fingerprints are available, captured network traffic may be searched for a matching fingerprint. For this, embodiments may use a comparison mechanism designed to look for the qualities provided in the fingerprints. To accomplish this, the captured packet data may be formatted, a search matrix constructed, and the matrix traversed to determine if a matching path exists. The following paragraphs describe embodiments of this process.

First, a data stream to be tested may be captured in a trace file. For some embodiments, rather than requiring processing to filter out the inbound data, only outbound data needs to be captured. This data may be made available to a matching mechanism that may generate size vector(s) and timing vector(s) as was done for the fingerprints. According to embodiments, these two vectors may contain only data which falls into the interesting range as defined previously, reducing the size of the required matrix and ignoring traffic which will never match the fingerprint. The resulting data may be in a similar format to the fingerprints, although many different flows may be present from multiple web requests.

According to embodiments, after formatting the input data, a matching mechanism may create an analysis matrix that may be used to find possible matches. When looking for matches, a single sub-fingerprint from the websites combined fingerprint may be analyzed at a time. The matrix may contain a column for each entry in the fingerprint being analyzed. Each column may contains index references to packets that match the required size for the fingerprint. The vector containing the traffic to be analyzed may be traversed, comparing the size of the packet at the current index, to all indexes of the fingerprints size vector. Every time a matching size is found, the index of the test set may be recorded in the corresponding column in the analysis matrix. It is possible that a single packet size is found in multiple locations in the fingerprint, and therefore any packet in the analysis trace may be recorded in multiple columns in the matrix.

Figure 3:
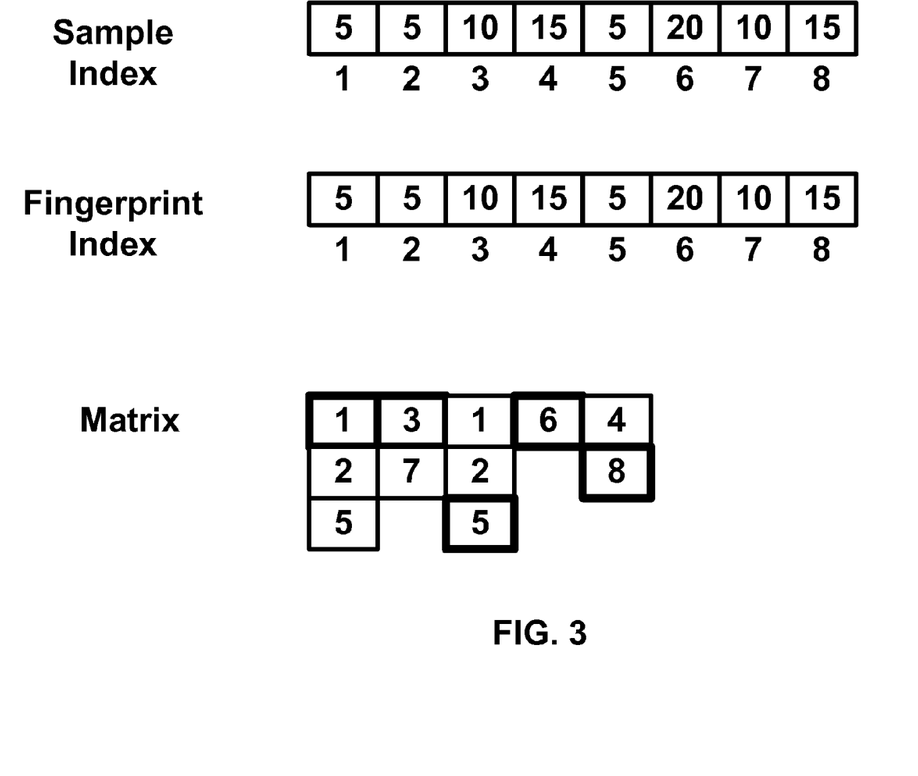
FIG. 3 is a diagram of an example matrix built from a sample set and a fingerprint as per an aspect of an embodiment of the present invention.

FIG. 3 shows an example matrix built from a sample set and a fingerprint. In this example, the sample and fingerprint rows represent size values, while the index is for easy reference to the location in the vector. Each column of the matrix contains all indexes where the fingerprints required size is matched. Since the fingerprint has the same size for the first and third packets, these columns in the matrix are identical. The sample is traversed, and all matching sizes have their index stored in the matrix, as shown.

Once the matrix has been generated, the matching process may then determine if an acceptable path exists through the matrix. The matrix may provide all packets of the appropriate size, but it may also be checked against the timing requirements from the fingerprint. Embodiments start with the first entry in the first column of the analysis matrix. This is the first packet that matches the correct starting size for the fingerprint. The index of this packet allows the arrival time to be quickly referenced. The arrival time of the first packet in the second column may be also determined. The difference in these arrival times may then be compared to a minimum and maximum time range of the fingerprint. If the time is not within the range, the next entry in the second column may be checked until a match is found or no other entries are available. If no matches are found, the process may start over again with the second entry in the first column, again searching for any timing that is within the range specified in the fingerprint. If a match is found, the columns in the search may be advanced, and the matching packet used as the new starting point, and the third column may be searched for an acceptable timing value. If a complete path is found through the matrix, then there exists a sequence of packets which match the given fingerprint size, order, and timing.

In the previous example shown in FIG. 3, one possible path through the matrix is indicated as bold boxes. This path may assume the timing of these packets were within the acceptable range. If they were not, an alternate path could have stated with the second entry in the first column.

This process may be done for each sub-fingerprint of a given website to look for all known variations of traffic associated with the given site. If a match is found, it is possible to not only return a result but to provide the packet sizes in the trace as well as the exact timing for the detected sequence.

Figure 4:
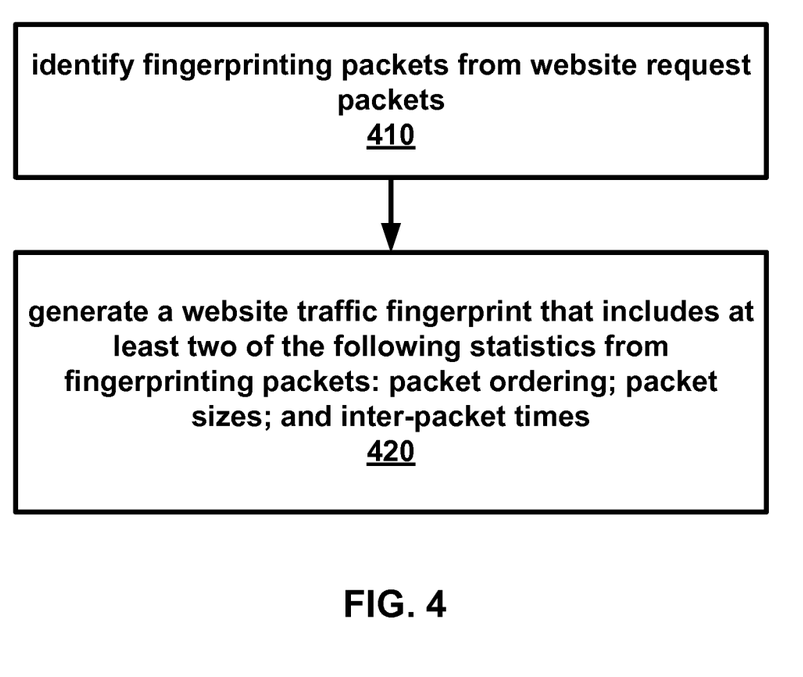
FIG. 4 is a flow diagram of process for generating a website fingerprint as per an aspect of an embodiment of the present invention.

FIG. 4 is a flow diagram of process for generating a website fingerprint. This process may be computer implemented using one or more computing machines. Embodiments of the process (or parts thereof) may be substantiated on one or more non-transient tangible computer readable mediums that contain computer readable instructions that when executed by one or more processors, causes the one or more processors to execute all or part of the process. Examples of non-transient tangible computer readable mediums include: solid-state memory, flash drives, hard drives, floppy drives, optical disks, DVDs, CDs, Blu-ray discs, or the like.

At 410, fingerprinting packets from website request packets to a website may be identified. The identification of fingerprinting packets may include looking at the packet size of each packet. Packets that have a size that is less than a minimum packet size may be rejected. A typical minimum packet size may be approximately 400 bytes. Similarly, packets that have a size that is greater than the maximum packet size may also be rejected. A typical maximum packet size may be approximately 1000 bytes. One of the features of some embodiments is that fingerprinting packet(s) may be encrypted.

Each of the fingerprinting packet(s) may also have a temporal location within the website requests. The temporal location is the location within the sequence of packets comprising a website request. Often, the temporal location may be described using a timestamp. Timestamp(s) may be internal to fingerprinting packet(s) or derived from an arrival time measurement of the fingerprinting packet(s).

Website traffic fingerprint(s) may be generated at 420. Website traffic fingerprint(s) may include: an ordering description, a size description, a timing description, or a combination thereof. The ordering description may include ordering data of at least two of the fingerprinting packets determined using the temporal location for each of the at least two of the fingerprinting packets. The size description may include size data of the packet size of at least two of the fingerprinting packets. The timing description may include timing data of at least two inter-packet times for at least two of the fingerprinting packets determined using the temporal location for each of the at least two of the fingerprinting packets; or a combination thereof. The ordering and the inter-packet times may be determined using the same fingerprinting packets.

Figure 5:
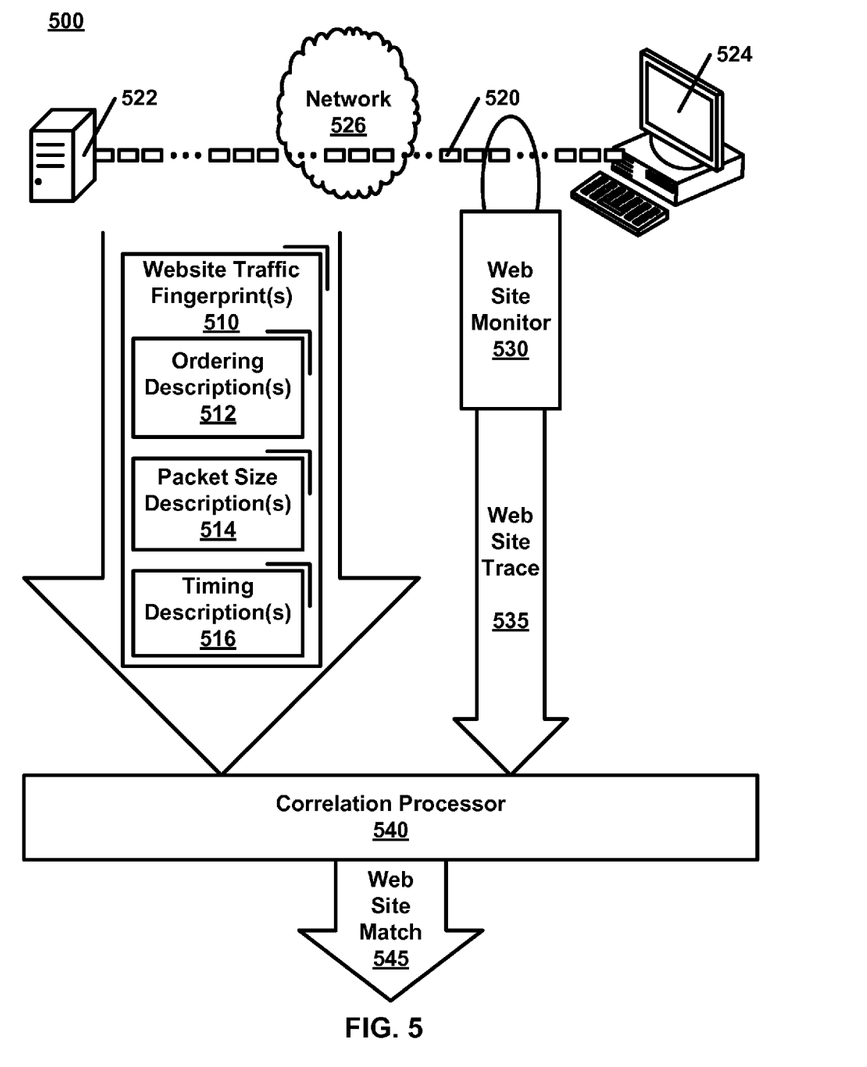
FIG. 5 is a block diagram of a website detector 500 according to aspects of an embodiment of the invention.

FIG. 5 is a block diagram of a website detector 500 according to aspects of an embodiment of the invention. Computer 524 is communicating with a Web server 522 via website packet flow 520 through network 526.

Web site monitor 530 may be configured to generate at least one web site trace 535 of packet statistics related to fingerprinting packets from website packet flow 520. Website packet flow 520 may be encrypted. Fingerprinting packets may be a subset of the website packet flow 520 having a packet size between a minimum packet size and a maximum packet size. A typical minimum packet size may be approximately 400 bytes and a typical maximum packet size may be approximately 1000 bytes.

The website detector 500 uses website traffic fingerprint(s) 510 that describe the website packet flow 520 for specific websites. Website traffic fingerprint(s) may include: an ordering description(s) 512, a size description(s) 514, a timing description(s) 516, or a combination thereof. The ordering description(s) 512 describes the temporal order of fingerprinting packet(s). The packet size description(s) 514 describe size of fingerprinting packet(s). The timing description(s) 516 describes inter-packet times between pairs of fingerprinting packet(s).

A correlation processor 540 may be configured to correlate a sequence of packet statistic(s) from the web site trace 535 with the size description(s) 512, the order description(s) 514, and timing description(s) 516 found in website traffic fingerprint(s) 510. Correlation processor 540 outputs any matches 545 between the web site trace 535 and website traffic fingerprint(s) 510.

Figure 6:
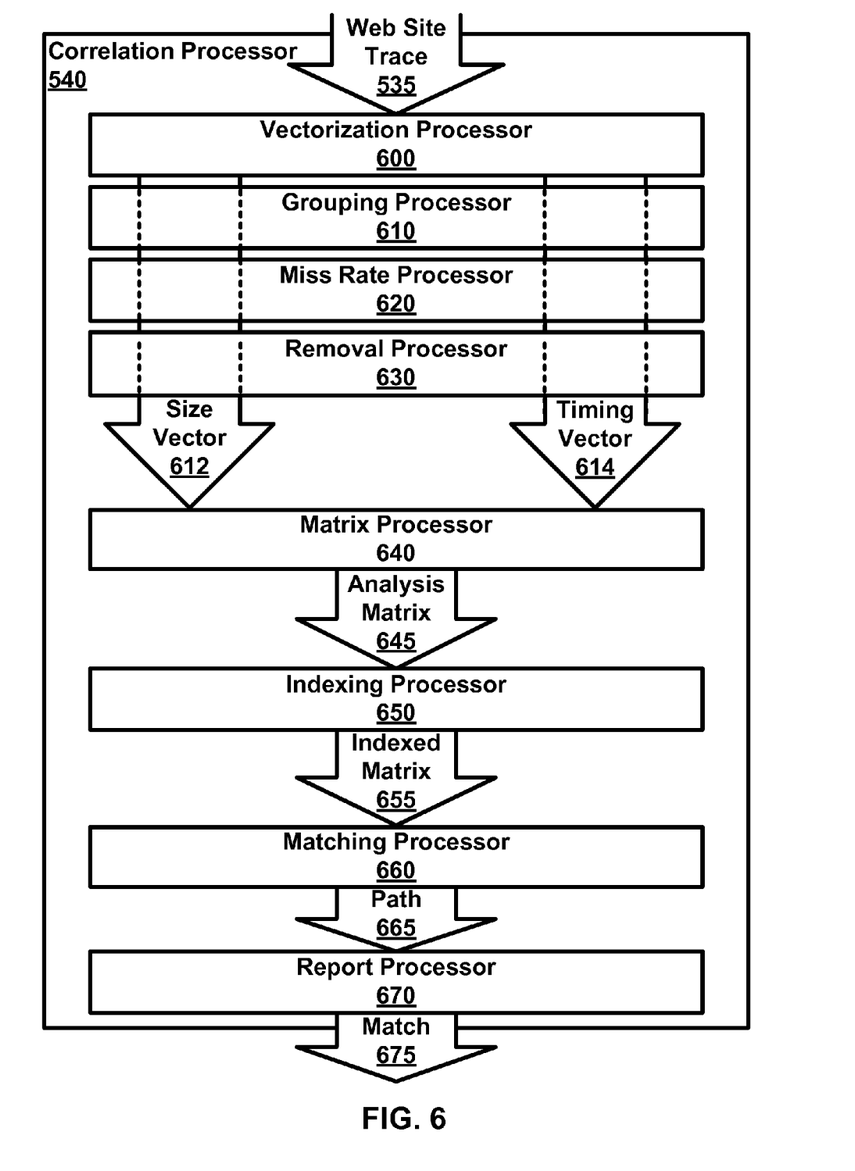
FIG. 6 is an expanded block diagram of a correlation processor 540 according to an aspect of an embodiment of the present invention.

FIG. 6 is an expanded block diagram of a correlation processor 540 according to an aspect of an embodiment of the present invention. As shown, the correlation processor 540 includes a vectorization processor 600 configured to use the web site trace 535 to create size vector 612 and timing vector 614. Size vector 612 may include ordered size statistics about fingerprinting packets and timing vector 614 may includes temporal information about fingerprinting packets. According to embodiments, size vector 612 and timing vector 614 may need to be kept consistent, especially when processed. According to some embodiments, the web site trace 535 may limit the statistics to fingerprinting packets in the outbound direction.

According to embodiments, grouping module 610 may be implemented in embodiments of the correlation processor 540. The grouping module 610 may be configured to group size vector entries and timing vector entries by at least one characteristic. These grouping could be treated as a sub-fingerprints. Characteristics may include any type of information useful in describing an embodiment relevant characteristic of a fingerprinting packet such as the length of a fingerprinting packet, an association of the fingerprinting packet with particular portions of web site requests, etc.

According to embodiments, miss rate processor 620 may be implemented in embodiments of the correlation processor 540. Miss rate processor 620 may be configured to calculate a miss rate among vectors in a grouping. A miss occurs when the length of a vector falls outside a prescribed limit. The number of misses is used to calculate a miss rate ratio. The miss rate processor 620 may remove variable packet vector(s) whose miss rate ratio exceeds a miss rate threshold from a grouping.

According to embodiments, removal processor 630 may be implemented in embodiments of the correlation processor 540. Size vector entries and timing vector entries associated with network errors or anomalies may corrupt a website fingerprint. Removal processor 630 may be configured to remove these size vector entries and timing vector entries associated with network errors or anomalies.

According to embodiments, matrix processor 640 may be implemented in embodiments of the correlation processor 540. Matrix processor 640 may be configured to create an analysis matrix 645 using the size vector 612 and the timing vector 614.

According to embodiments, indexing processor 650 may be implemented in embodiments of the correlation processor 540. Indexing processor 650 may be configured to generate an indexed matrix 655 by indexing index size vector entries 612 in the analysis matrix 645 to fingerprint size vector entries that have sizes that are within an configurable error margin.

According to embodiments, matching processor 660 may be implemented in embodiments of the correlation processor 540. Matching processor 660 may be configured to determine if a path 665 exists through the indexed analysis matrix 655. The matching processor 660 may attempt to locate a path through the indexed analysis matrix 655 by sequentially matching the inter-packet times between indexed entries in the indexed analysis matrix 655.

According to embodiments, reporting processor 670 may be implemented in embodiments of the correlation processor 540. Reporting processor 670 may be configured to output a positive indicator 675 when the matching processor 660 determines that a path 665 exists through the indexed analysis matrix 655.

Additional website request information about a website could improve a website fingerprint. Packet statistics from web site trace(s) 535 may be used to update website traffic fingerprint(s).

In this specification, "a" and "an" and similar phrases are to be interpreted as "at least one" and "one or more."

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e hardware with a biological element) or a combination thereof, all of which are behaviorally equivalent. For example, modules may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) analyzing website traffic. However, one skilled in the art will recognize that embodiments of the invention could be used to analyze other types of packet traffic related to other types of communications such as communications to mail servers, DNS servers, ftp severs, peer to peer communications, SCADA communications, etc.

In addition, it should be understood that any figures that highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A computer implemented process comprising:
   identifying fingerprinting packets from website request packets to a website, at least one of the fingerprinting packets being encrypted, each of the fingerprinting packets having:
      a packet size between a minimum packet size and a maximum packet size; and
      a temporal location within the website requests; and
   generating a website traffic fingerprint that includes at least two of the following:
      an ordering description of at least two of the fingerprinting packets determined using the temporal location for each of the at least two of the fingerprinting packets;
      a packet size description of at least two of the fingerprinting packets; and
      a timing description of at least two inter-packet times for at least two of the fingerprinting packets determined using the temporal location for each of the at least two of the fingerprinting packets.

2. The computer implemented process according to claim 1, wherein the temporal location is determined using a timestamp.

3. The computer implemented process according to claim 2, wherein the timestamp is internal to at least one of the fingerprinting packets.

4. The computer implemented process according to claim 2, wherein the timestamp is derived from an arrival time measurement of at least one of the fingerprinting packets.

5. The computer implemented process according to claim 1, wherein the minimum packet size is less than 400 bytes.

6. The computer implemented process according to claim 1, wherein the maximum packet size is greater than 1000 bytes.

7. The computer implemented process according to claim 1, wherein the ordering and the inter-packet times are determined using the same fingerprinting packets.

8. A website detector comprising:
   a module configured to receive at least one website traffic fingerprint that includes at least one of the following:
      an ordering description of at least two fingerprinting packets;
      a packet size description of at least two of the fingerprinting packets; and
      a timing description of at least two of the fingerprinting packets; and
   a website monitor configured to generate at least one website trace of packet statistics related to fingerprinting packets from a website packet flow, at least one of the fingerprinting packets being encrypted, each of the fingerprinting packets having a packet size between a minimum packet size and a maximum packet size; and
   a correlation processor configured to correlate a sequence of packet statistics in at the at least one website trace with the size description, the order description, and timing description found in at least one of the at least one website traffic fingerprints.

9. The website detector according to claim 8, wherein the correlation processor includes a vectorization processor configured to use the website trace to create:
   a size vector that includes ordered size statistics about fingerprinting packets; and
   a timing vector that includes temporal information about fingerprinting packets.

10. The website detector according to claim 9, wherein the size vector and timing vector are kept consistent.

11. The website detector according to claim 9, further including a grouping module configured to group size vector entries and timing vector entries by at least one characteristic.

12. The website detector according to claim 11, wherein at least one characteristic is length.

13. The website detector according to claim 11, wherein at least one characteristic is an association with similar portions of website requests.

14. The website detector according to claim 11, further including a miss rate processor configured to calculate a miss rate among vectors in a grouping.

15. The website detector according to claim 14, wherein the miss rate processor is further configured to remove variable packet vectors whose miss rate ratio exceeds a miss rate threshold from a grouping.

16. The website detector according to claim 9, further including a removal processor configured to remove size vector entries and timing vector entries associated with network errors or anomalies.

17. The website detector according to claim 9, further including a matrix processor configured to create an analysis matrix using the size vector and the timing vector.

18. The website detector according to claim 17, further including an indexing processor configured to index size vector entries in the analysis matrix to fingerprint size vector entries that have sizes that are within a configurable error margin.

19. The website detector according to claim 18, further including a matching processor configured to determine if a path exists through the analysis matrix.

20. The website detector according to claim 19, wherein the matching processor is configured to locate the path through the analysis matrix by sequentially matching the inter-packet times between indexed entries in the analysis matrix.

21. The website detector according to claim 19, further including a reporting processor configured to output a positive indicator when the matching processor determines that the path exists through the analysis matrix.

22. The website detector according to claim 8, wherein the website trace includes at least one statistic related to fingerprinting packets in the outbound direction.

23. The website detector according to claim 8, wherein at least one packet statistic from at least one website trace is used to update at least one website traffic fingerprint.

* * * * *